(12) United States Patent
Watanabe et al.

(10) Patent No.: US 6,214,976 B1
(45) Date of Patent: Apr. 10, 2001

(54) CHEMICAL METHOD FOR LIGNIN DEPOLYMERIZATION

(75) Inventors: Takashi Watanabe, Hirakata (JP); Kurt Messner; Karin Koller, both of Vienna (AT)

(73) Assignees: T. Watababe, Osaka (JP); K. Messner, Vienna ( * ) Notice: Subject to any disclaimer, the term of this patent is extended or adjusted under 35 U.S.C. 154(b) by 0 days.

(21) Appl. No.: 09/503,855

(22) Filed: Feb. 14, 2000

Related U.S. Application Data (63) Continuation of application No. PCT/IB97/00991, filed on Aug. 14, 1997.

(51) Int. Cl.[7] ............................. C07G 1/00; C08L 97/00
(52) U.S. Cl. ........................................... 530/500; 530/506
(58) Field of Search ..................................... 530/500, 506

(56) References Cited

U.S. PATENT DOCUMENTS

| | | |
|---|---|---|
| 4,614,646 | 9/1986 | Christiansen . |
| 4,773,966 | 9/1988 | Huynh . |
| 5,447,603 | 9/1995 | Michalowski et al. . |

FOREIGN PATENT DOCUMENTS

| | | |
|---|---|---|
| 0447673 | 9/1991 | (EP) . |
| PCT/EP94/01966 | 6/1994 | (WO) . |

OTHER PUBLICATIONS

R. Bourbonnais, M. G. Paice, Appl. Microbiol. Biotechnol. 36, 823–827, 1992.
H.P. Call, I. Mücke, J. Biotech. 53, 163–202, 1997.
G. C. Hobbs and J. Abbot, J. Wood Chem. Technol., 14, 195–225, 1994.
S. Kawai and H. Ohashi, Holzforschung, 47, 97–102, 1993.
M. M. Santos et al., J. Braz. Chem. Soc., 6, 257–260, 1995.
Van–Ba Huynh, Biochem. Biophys. Res. Commun., 139, 1104–1110, 1986.
R. W. Mellenberger et al., J. Sci. 30, 1005–1011, 1970.

*Primary Examiner*—Nathan M. Nutter
(74) *Attorney, Agent, or Firm*—BakerBotts, LLP (57) ABSTRACT

A process for depolymerizing and/or chemically modifying lignin or lignin-like compounds in which a solution of copper and peroxide acts on lignin and/or lignin-like substance at a temperature of less than 100° C., characterized in that the solution is an aqueous solution containing copper or a copper complex, a coordination compound and peroxide and wherein the concentration of the copper or copper complex is between 0.001% and 5%, and wherein the concentration of the coordination compound is lower than 20% and wherein the concentration of peroxide is between 0.01% and 20%.

16 Claims, 6 Drawing Sheets

CHEMICAL METHOD FOR LIGNIN DEPOLYMERIZATION

This is a continuation of application PCT/IB97/00991 filed Aug. 14, 1997 now WO 99/09244.

DESCRIPTION

Technical Field

This invention relates to a new method for depolymerizing and/or modifying lignin or lignin related compounds by using copper, a copper coordination compound and peroxide in an aqueous solution. Lignin, a heterogeneous phenylpropanoid structural polymer of vascular plants, is the most abundant renewable material next to cellulose but it constitutes a barrier which must be broken down before utilization of cellulose. Lignin related, or lignin like, compounds include lignins that are synthetically produced. Over centuries, extensive studies have been made to degrade lignin by chemical, enzymatic and microbial treatments of woody materials.

The technology of delignification accumulated so far is mainly utilized for the production of paper or dissolving pulp. For that reason the present invention is mainly discussed in relation to methods used for delignification in pulp and paper production, although its field of application goes far beyond. It includes also processes like deinking of waste paper, effluent treatment, pretreatment of lignocellulosics as animal feed stock, wood saccharification and wood processing. It can also be used to depolymerize or modify lignin-related compounds like polyaromatic hydrocarbons (PAH) or coal.

Chemical pulp production includes mainly methods such as kraft pulping, sulfite pulping or soda pulping. The aim of these technologies is bulk delignification of wood or other lignocellulosic materials like straw. In mechanical pulping, chemical pretreatment of wood chips at elevated temperatures (CTMP) is usually practiced to reduce the refining energy and to improve pulp quality.

The second and more critical step in pulp production is pulp bleaching, aiming at the removal of lignin and chemical modification of the remaining lignin in the pulp. In classical bleaching technologies pulp is treated with chlorine, chlorine dioxide and hypochlorite. Because of the adverse effect of chlorine in nature, totally chlorine free bleaching sequences (TCF) based on oxygen, ozone, and alkaline peroxide or sodium peroxide were developed more recently. The modern oxygen-based bleaching sequences are environmentally benign but compared to chlorine bleaching, the chemical reactions are much less specific and lead to a bleached pulp of higher lignin content and reduced fibre strength. While in chlorine bleached pulps the kappa value for the lignin content was 1 or lower, commercial TCF bleached pulps may have kappa values of 4–6. The high lignin content of these pulps is a great disadvantage and leads to yellowing and accelerated aging of paper. Another drawback of TCF bleached pulps is the decrease in fiber strength due to less specific chemical reactions.

To overcome the low specificity of the TCF bleaching sequences biological agents like white rot fungi or the isolated ligninolytic enzymes of these fungi have been investigated for pulp bleaching recently. However, when living fungi are used for bleaching, an incubation time of at least 4 days has to be accepted, making this method only interesting for fundamental studies. The main enzymes known to be responsible for lignin degradation in nature are laccase, manganese peroxidase and lignin peroxidase. The latter two enzymes are out of scope for technical applications as they can only be produced on laboratory scale so far. Laccase is already produced by large-scale fermentation and a technical bleaching process including the use of the mediators like ABTS or HBT is described in the literature (R. Bourbonnais, M. G. Paice, Appl. Microbiol. Biotechnol. 36, 823–827, 1992; H. P. Call, I. Mücke, J. Biotech. 53,163–202, 1997) and in the patent PCT/EP94/01966. In combination with other bleaching sequences this process results in pulp of high brightness and viscosity but the lignin content is still high and comparable to that of TCF bleached pulp and not of chlorine bleached pulp. Furthermore, the known laccase/mediator process has some crucial drawbacks: due to their way of production, ligninolytic enzymes are relatively expensive and have to be used within stringent process conditions, usually at acidic pH. Their industrial use requires skilled personnel. Moreover, the mediator ABTS cannot be used industrially as it creates colored reaction products. The mediator HBT is not redox recycled and has to be applied in large amounts of about 5–10% of the dry weight of pulp (H. P. Call, I. Mücke, J. Biotech. 53,163–202, 1997). Moreover, its environmental impact is questionable. So far, no new mediators to overcome the drawbacks have been reported.

Chemical bleaching processes are mostly easier to handle, are usually cheaper and if the desired bleaching effect is reached and the environmental requirements are complied with, they are more advantageous than microbial and enzymatic treatments. However, the chemical reactions developed so far either lead to toxic degradation products like organochlorine or to a high lignin content and unspecific reactions depolymerizing the cellulose.

BACKGROUND ART

Various approaches to develop new and more specific chemical lignin depolymerizing processes for industrial purposes are reported in the literature. G. C. Hobbs and J. Abbot (J. Wood Chem. Technol., 14, 195–125, 1994) tried to use free copper ions as additive in peroxide bleaching without the application of a coordination compound to bleach Eucalyptus regnans SGW pulp. The addition of free copper ions did not improve the result: the brightness increase in a three-hour peroxide bleaching stage using copper was 17.6% compared to 18.4% without copper. No results are reported on the reduction of kappa or viscosity values.

In some cases the idea was to mimic the redox cycle of the lignin polymerizing/depolymerizing enzymes. Laccase is a copper containing enzyme which is oxidized by molecular oxygen while lignin peroxidase and manganese peroxidase are iron containing enzymes, oxidized by hydrogen peroxide. No copper containing enzyme, oxidized by hydrogen peroxide is known. Related to lignin degradation, copper is a transition metal constituting the catalytic site of laccase. Copper also constitutes the catalytic site of various other metal proteins such as galactose oxidase, tyrosinase, ascorbate oxidase, superoxide dismustase, nitrite reductase, hemocyanin and plastocyanin. In relation to this invention a system mimicking the catalytic function of laccase reported by S. Kawai and H. Ohashi (Holzforschung, 47, 97, 1993) has to be mentioned. Dimeric lignin model compounds were decomposed in the organic solvent dichloromethane by a copper-amine complex. This reaction does not include peroxide in the catalytic cycle and for that reason cannot be compared with the reaction described in this invention.

A reaction of copper with lignin including peroxide has been reported by M. M. Santos et al. (J. Braz. Chem. Soc., 6, 257, 1995). The so-called Gif system has been developed originally to achieve the oxygenation of hydrocarbons. The reaction medium of the Gif system is invariably a mixture of pyridine and carboxylic acid, in which carboxylic acid, as well as the organic solvent pyridine has to be present in large excess (80% solution). Santos et al. tried to use the Gif system to decompose isolated lignin from different pulps with Cu(II) plus Fe (II) in a pyridine/acetic acid solution under an inert atmosphere. Under these conditions, phenolic degradation products were analyzed, but concomitantly a high amount of toxic pyridine derivatives such as 2,2'-bipyridyl, 2,3'-bipyridyl, methyl pyridine and pyridinone are yielded. The high amount of pyridine per se as well as the creation of large amounts of toxic derivatives makes it impossible to utilize this process for industrial purposes, as stated by the authors.

Oxidation of lignin model compounds with copper and peroxide in a 83% acetic acid solution as solvent has been reported by Van-Ba Huynh (Biochem. Biophys. Res. Commun., 139, 1104, 1986). This reaction was carried out at refluxing temperature above 100° C.

Only the last two processes can be compared to some extent with the present invention as peroxide is used and organic compounds are added to the lignin degrading copper/peroxide system. The difference between the two methods and the method described in this invention is that the former reactions are carried out in organic solvents above 80% concentration, while in this invention the depolymerization of lignin by copper/peroxide is claimed to take place in aqueous solutions with addition of only low amounts of various copper coordination compounds. These conditions can be regarded to be a prerequisite for an industrial application.

Another reaction, very different from the one claimed here, but mimicking biological processes is the reaction of Fe2+ with hydrogen peroxide, known as Fenton reaction, which is carried out by brown rot fungi and decomposes preferably the carbohydrates in lignocellulosic material. Likewise, manganese is known as a degrader of lignin when oxidized to Mn (III) by manganese peroxidase.

BRIEF DESCRIPTION OF THE TABLES

TABLE 1 is a table reporting the bleaching of oxygen delignified kraft pulp (OKP) by using cooper and coordination compound plus organic peroxide as an additional step to alkaline hydrogen peroxide bleaching.

TABLE 2 is a table reporting the bleaching of oxygen delignified kraft pulp (OKP) by adding cooper and coordination compounds to an alkaline hydrogen peroxide stage OKP—Q—P(Cu).

TABLE 3 is a table reporting the percentage in vitro digestibility of straw.

DISCLOSURE OF INVENTION

The object of the present invention is to provide a highly efficient chemical lignin depolymerizing and/or modifying system which can be applied in various technical processes as for instance to overcome the problems mentioned in connection with pulp bleaching as well as for chemical or mechanical pulping, deinking, straw delignification for cattle feed, degradation of polyaromatic hydorcarbons, coal liquefaction etc. The methods described herein make it possible to degrade lignin in aqueous solutions, at temperatures below 100° C., without major damage to cellulose and without excessive use of expensive and toxic reagents.

The invention relates to the depolymerization of lignin or lignin related compounds by using an aqueous solution of copper, a copper coordination compound and peroxide.

According to the present invention, copper can be added to the solution as free copper ion, copper salt or already as copper-coordination compound complex in a concentration of 0.001–5%.

The term "coordination compound", as used in this invention, is defined as neutral, cationic or anionic compound which creates a coordination bond with Cu(I), Cu(II) or Cu(III) ions and catalyzes a redox reaction. Both monodentate and multidentate ligands can be applied in this invention. The coordination compounds include compounds containing nitrogen, such as pyridine, histidylglycine, phthalocyanine, acetonitril; containing a hydroxyl group, such as catechol; containing ether, such as 18-crown-6; containing sulfur, such as mercaptosuccinic acid; or containing olefinic double bonds, such as 1,3-cyclohexadiene.

By using copper coordination compounds according to this invention, the depolymerization of lignin is drastically accelerated and the specificity of the reaction for lignin degradation versus cellulose degradation is increased. According to this invention, concentrations of coordination compounds in aqueous solutions below 20%, preferably between 0.001–5% are claimed to be sufficient to promote the selective depolymerization of lignin.

As source of peroxide necessary for the method described in claim 1 of this invention hydrogen peroxide can be used, as described in the prior art, or as described in claim 8, organic peroxides, peracids, metal salts of peracids or as described in claim 9, chemical compounds generating peroxide can be selected depending on the intended purpose. Peroxide is added in a concentration of 0.01–20%, preferably between 0.1–10%. Especially when copper is used with organic peroxides, as claimed in this invention, the selective depolymerization of lignin is further increased.

If the technical application of this invention is pulp bleaching, the method according to this invention can be used as bleaching step in addition to usual bleaching sequences or the copper/coordination system of claim 1 can be used integrated in a peroxide bleaching step. In this case, the claimed low concentrations of copper and coordination compound are added to an aqueous peroxide bleaching solution, thus improving the efficiency of the peroxide stage in terms of the amount of delignification and selectivity of the reaction.

Peroxides necessary for the reaction according to this invention can be added to the copper/coordination compound system at the start of the reaction or can be generated by an in situ reaction by a peroxide generating system during the process of lignin degradation. All of the compounds can also be added continuously. Stirring of the lignin containing substrate-copper-coordination compound-peroxide system is usually of advantage but is not a prerequisite.

The present invention provides a new technology for the depolymerization of lignin at temperatures below 100° C. in aqueous solutions by the combination of copper and peroxides in the presence of coordination compounds in low concentrations.

In the reactions described by M. M. Santos et al. (1995) and by Van-Ba Huynh (1986), pyridine and acetic acid, respectively, are used in 80% solutions, acting as organic solvents for the reaction of copper/peroxide with lignin, whereas according to the present invention, compounds like pyridine or other copper coordination compounds, as claimed in this invention, are used in low concentrations—lower than 20%, preferably at 0.1–5%. In contrast to the Santos and Van-Ba Huynh reaction acetic acid is not needed in the method according to the present invention.

By optimizing the concentrations of the compounds involved in the present invention and by analyzing their effect on lignin and cellulose of industrial kraft pulp it was possible to identify the positive effect of low concentrations of copper coordination compounds like pyridine as well as on the depolymerization of lignin and on the preservation of the fibre strength of cellulose.

In the method of the present invention, the role of the added compound like pyridine, is not any more to create an organic solution for the lignin model compounds or for the isolated lignin, but to act as coordination compound of copper which can be used in very low concentrations. This is an essential prerequisite to make such processes economically feasible for technological applications, as for example for pulp production. Besides reducing the costs by the low concentration it avoids the creation of high amounts of undesired degradation products, as produced in the Gif system described by Santos et al. The authors themselves describe the Gif system to be inappropriate for pulp bleaching. The same applies to the method described by Van-Ba Huynh. Furthermore, the method claimed in the present invention differs from the latter one in that it is carried out below 100° C. and not at reflux temperatures above 100° C. and with acetic acid as solvent.

The unexpected result of the optimization procedure, namely the enforcing role of compounds like pyridine in very low concentrations in the lignin depolymerizing reaction of copper and peroxide, made it possible to identify their role as coordination compounds for copper and in turn to identify various other groups of compounds, as described in claim 2, also acting as coordination compounds and accelerating the lignin depolymerization.

BEST MODE OF CARRYING OUT THE INVENTION

Example 1

Lignin degradation in general: depolymerization of synthetic $^{14}$C-labeled lignin (DHP) with copper, pyridine and hydrogen peroxide.

Figure 1A:
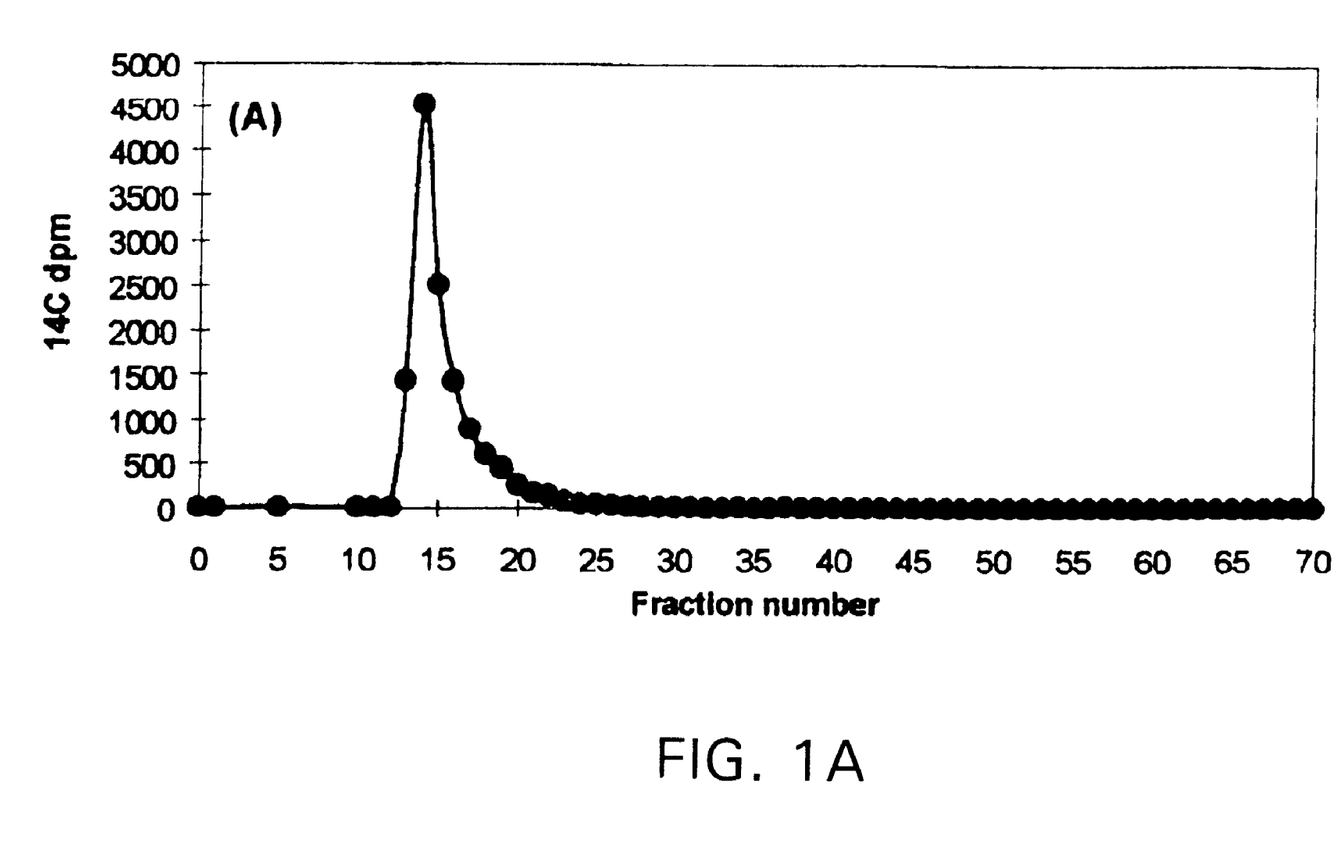
FIG. 1A is a gel filtration profile of synthetic $^{14}$C-labeled lignin (control).
Figure 1B:
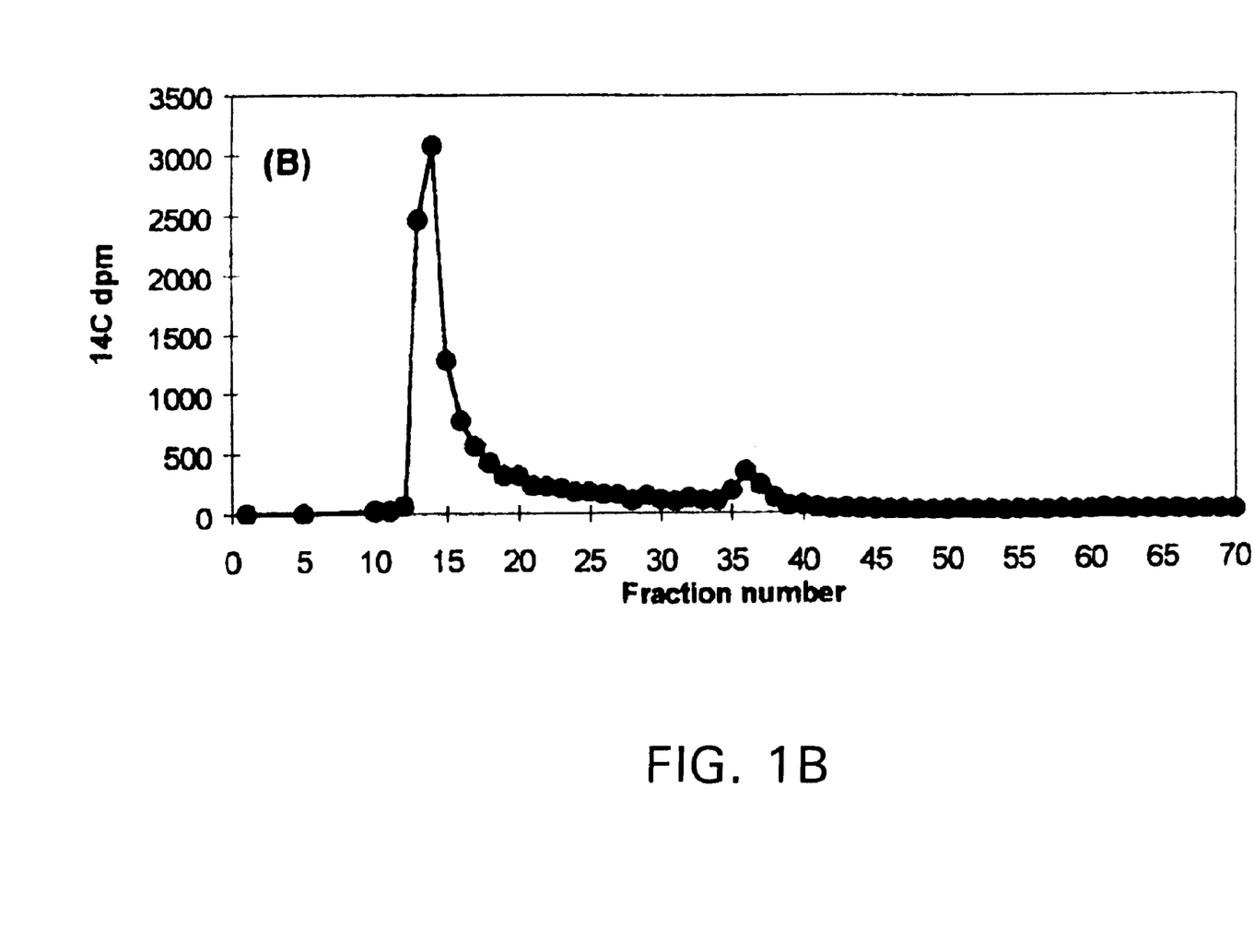
FIG. 1B is a gel filtration profile of synthetic $^{14}$C-labeled lignin treated by copper, pyridine and $H_2O_2$.
Figure 1C:
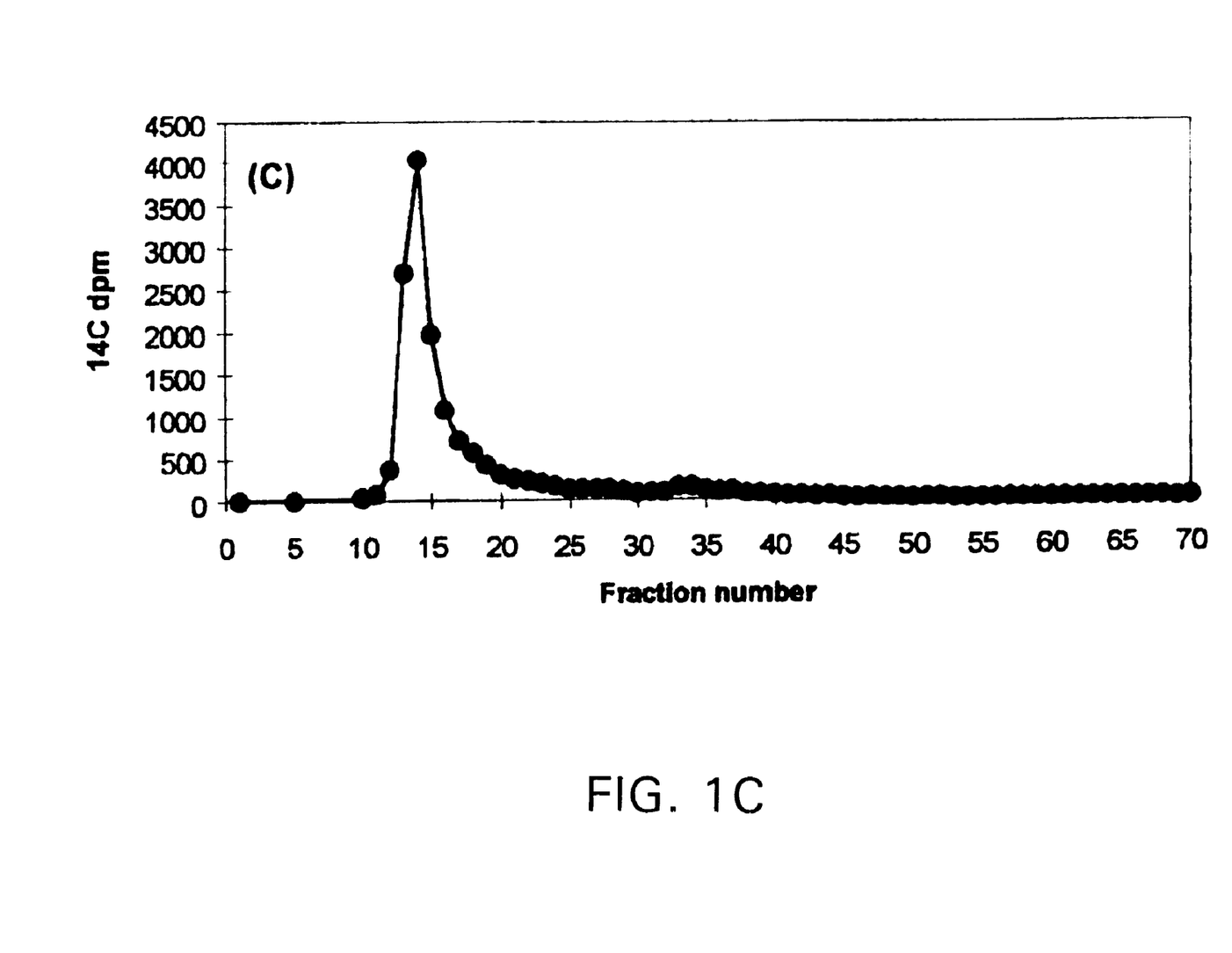
FIG. 1C is a gel filtration profile of synthetic $^{14}$C-labeled lignin treated by copper and $H_2O_2$.

Synthetic $^{14}$C-labeled lignin (5 µl, 14500 dpm) was pipetted into a small glass vial. 10 µl Pyridine, 50 µl CuSO$_4$ (10 mM), and 35 ml water were added and stirred for 30 min. At the start of the reaction and after 30, 60, 90 and 120 minutes 20 µl of H$_2$O$_2$ (1 M) were added to the reaction mixture and stirred at room temperature for 150 minutes. After the reaction, the lignin was sized by preparative gel permeation chromatography (GPC) on a 1.5×42 cm column of Sephadex LH20 (Pharmacia LKB Biotechnology Inc.) in DMF with 0.08M LiCl.
Results: (FIG. 1)

The synthetic lignin was depolymerized by the H$_2$O$_2$/Cu (II)/pyridine system. Degradation compounds smaller than monomeric lignin model compounds (veratraldehyde) were formed by this system.

Example 2

Lignin degradation in general: depolymerization of synthetic $^{14}$C-labeled lignin (DHP) with copper, pyridine and organic peroxide (tert-butyl hydroperoxide).

Figure 2A:
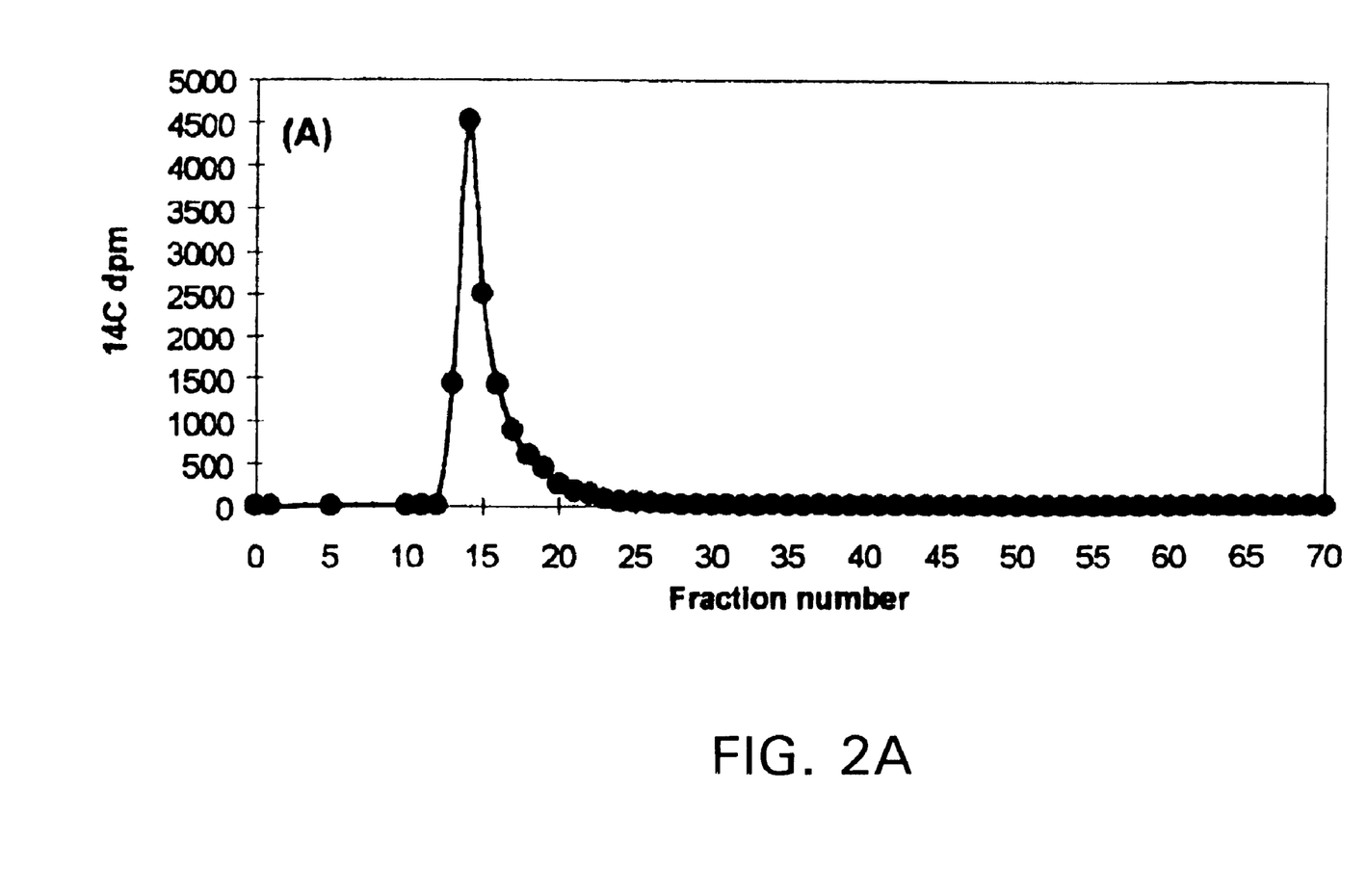
FIG. 2A is a gel filtration profile of synthetic $^{14}$C-labeled lignin (control).
Figure 2B:
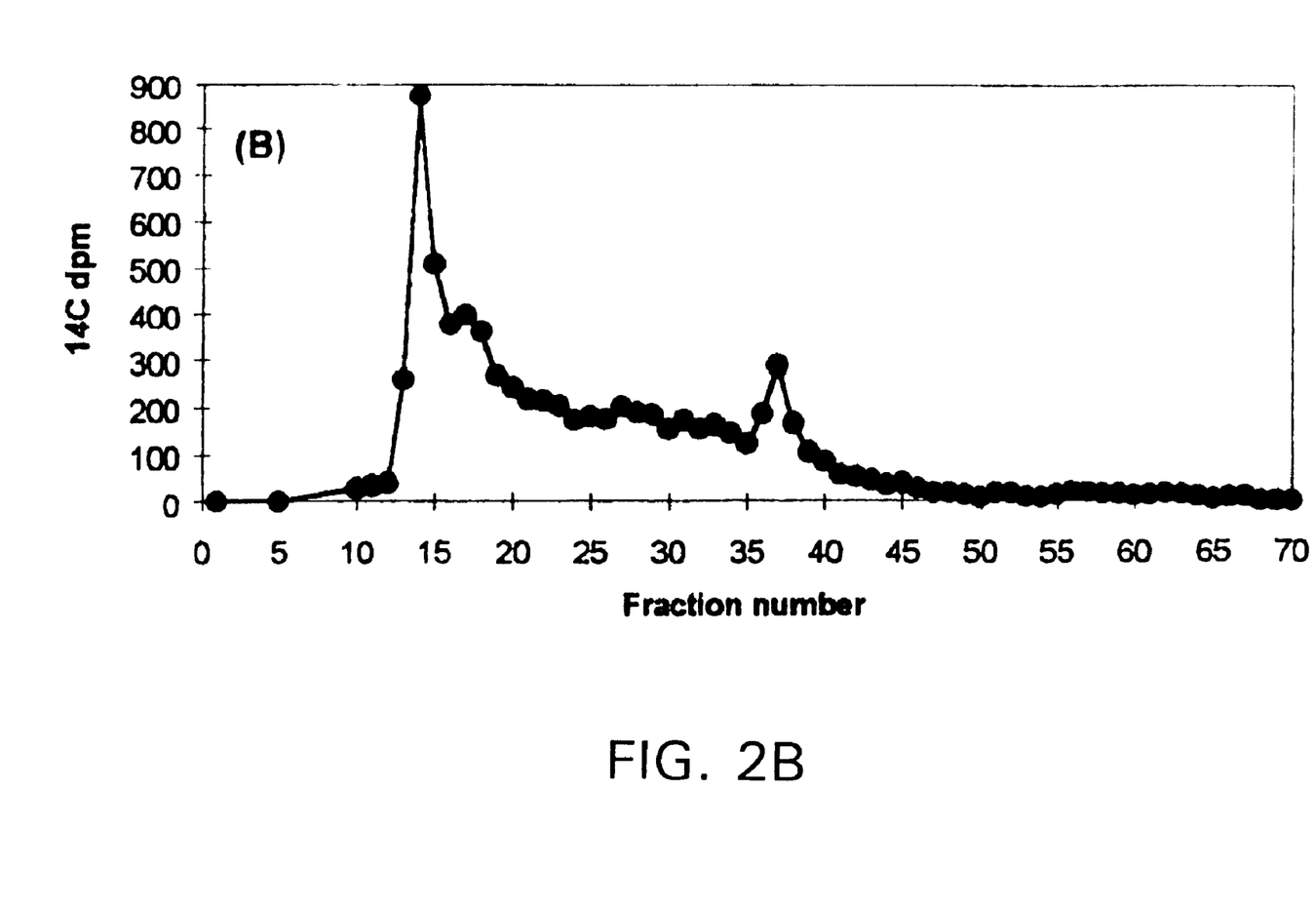
FIG. 2B is a gel filtration profile of synthetic $^{14}$C-labeled lignin treated by copper, pyridine and CHP.
Figure 2C:
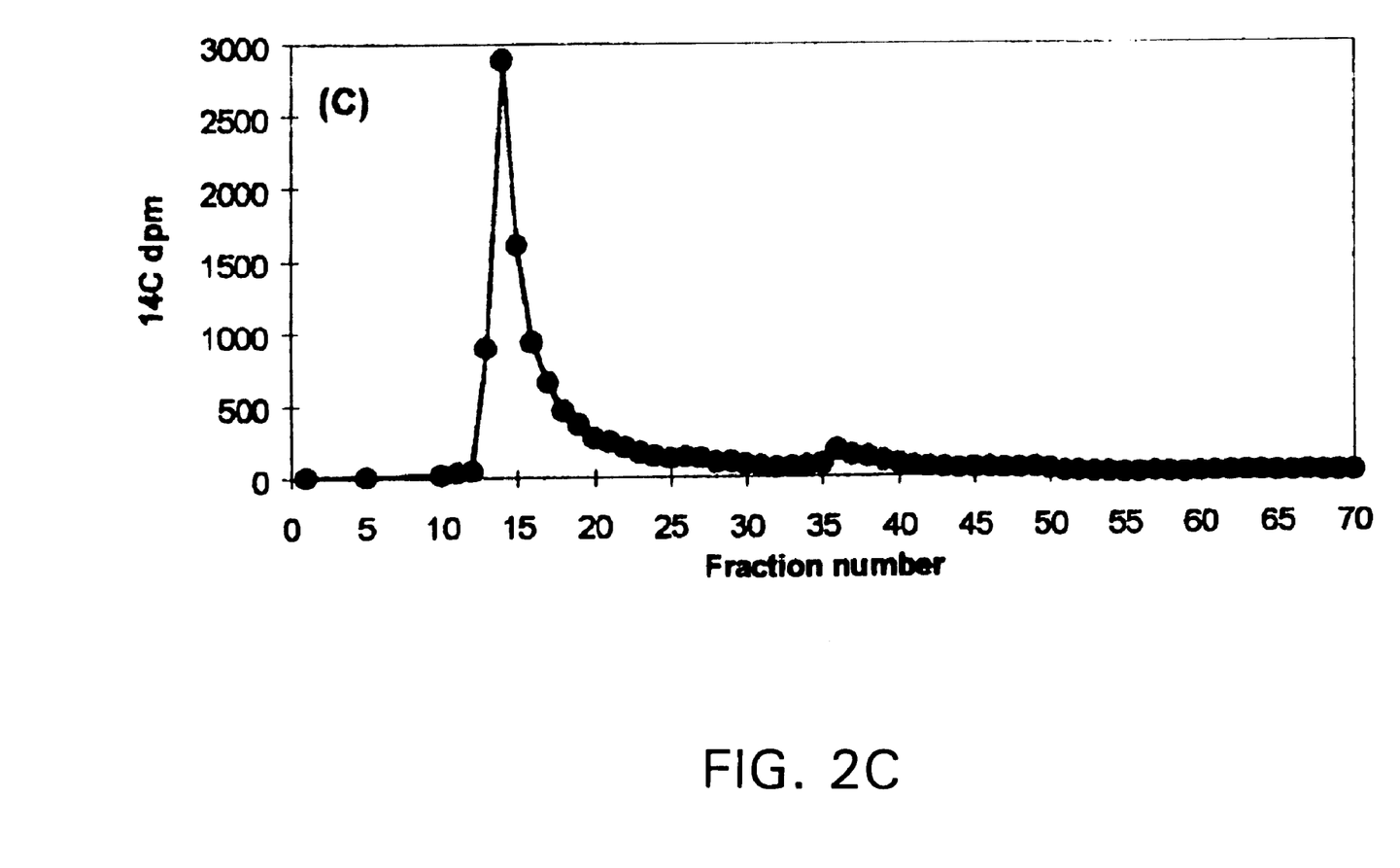
FIG. 2C is a gel filtration profile of synthetic $^{14}$C-labeled lignin treated by copper and CHP.

Synthetic $^{14}$C-labeled lignin (5 µl, 14500 dpm) was pipetted into a small glass vial. 10 µl Pyridine, 50 µl CuSO$_4$ (10 mM), and 115 µl water were added and stirred for 30 min. At the start of the reaction, 20 µl of a 0.8% aqueous cumene hydroperoxide solution was added to the reaction mixture and stirred at room temperature for 72 hr. After the reaction, the lignin was sized by preparative gel permeation chromatography (GPC) on a 1.5×42 cm column of Sephadex LH20 (Pharmacia LKB Biotechnology Inc.) in DMF with 0.08M LiCl.

10 µl water were added instead of pyridine in the control.
Results: (FIG. 2)

The synthetic lignin was intensively depolymerized by the cumene hydroperoxide/Cu(II)/pyridine system. It is evident from FIG. 2 that the addition of pyridine greatly enhanced the depolymerization rate of the lignin.

Example 3

Bleaching of oxygen delignified kraft pulp (OKP) by using copper and coordination compound plus organic peroxide as an additional step to alkaline hydrogen peroxide bleaching (Cu—E—Q—P—P—P).

100 g wet weight (contains 20 g dry weight) of oxygen delignified kraft pulp are added to:

Cu-stage: 100 ml water, 10 ml copper sulfate (10 mM), 0.5 ml organic peroxide (CHP), 1 ml solution of copper coordination compound[1]. The pulp suspension is mixed and incubated at 80° C. for 240 minutes. The pulp is washed twice with water. E-stage: 10% consistency, 10% NaOH on pulp, 60° C. for 1 hour. Q-stage: The pulp is washed with a solution containing a Na-salt of EDTA (0.5% on pulp DW) at pH 5 for 1 hour at 90° C. at 10% consistency. P-stage: After thorough washing pulp bleaching was carried out at 10% consistency at 90° C. in one or three stages using 2.5, 2.0, 1.5% H$_2$O$_2$ and 2.5, 2.0, 1.0% NaOH on pulp, respectively, in each stage. The bleaching time was 4 hours in each stage with stabilizers (0.05% MgSO$_4$×7H$_2$O and 0.2% Na-salt of DTPA). The pulp was filtered and washed with destilled water.

[1] In each experiment one of the following reagents were used as copper coordinating compounds: 1) pyridine, 2) catechol, 3) 18-crown-6, 4) mercaptosuccinic acid, 5) 1,3-cyclohexadiene.

Results: Table 1:

|  | kappa number | brightness (% ISO) | viscosity (ml/g) |
|---|---|---|---|
| OKP | 16.6 | 39.8 | 998 |
| OKP-Q-P | 12.9 | 52.9 | 958 |
| OKP-Q-P-P-P | 6.2 | 76.0 | 663 |
| OKP-Cu1)-E-Q-P | 3.4 | 75.7 | 745 |
| OKP-Cu1)-E-Q-P-P-P | 1.8 | 86.4 | 670 |
| OKP-Cu2)-E-Q-P | 4.9 | 69.3 | 725 |
| OKP-Cu3)-E-Q-P | 3.7 | 73.2 | 707 |
| OKP-Cu4)-E-Q-P | 5.4 | 70.8 | 692 |
| OKP-Cu5)-E-Q-P | 6.9 | 64.0 | 768 |

Example 4

Bleaching of oxygen delignified kraft pulp (OKP) by adding copper and coordination compounds to an alkaline hydrogen peroxide stage OKP—Q—P(Cu).

Q-stage: The pulp is washed with a solution containing a Na-salt of EDTA (0.5% on pulp DW) at pH 5 for 1 hour at 90° C. at 10% consistency. P(Cu)-stage: After thorough washing 10 ml of CuSO$_4$ (10 mM) and 1 ml pyridine were added to 130 ml pulp suspension (10% consistency) and mixed thoroughly. Pulp bleaching was carried out at 90° C. in one stage using 4% H$_2$O$_2$ and 7.5% NaOH on pulp. The bleaching time was 4 hours with stabilizers (0.05% MgSO$_4$× 7H$_2$O and 0.2% Na-salt of DTPA). The pulp was filtered and washed with destilled water.

Result: Table 2:

|  | kappa number | brightness (% ISO) | viscosity (ml/g) |
|---|---|---|---|
| OKP | 16.6 | 39.8 | 998 |
| OKP-Q-P | 10.9 | 65.8 | 879 |
| OKP-Q-P(Cu) | 6.4 | 71.2 | 712 |

Example 5

Improvement of the digestibiliy of straw:

20 g (DW) of blended barley straw are added to a solution containing 100 ml water, 10 ml copper sulfate (10 mM), 20 ml H$_2$O$_2$ (1 M) and 1 ml pyridine. The straw suspension is mixed and incubated at 80° C. for 240 minutes. Afterwards the suspension is washed twice with water and extracted at 10% consistency with 10% NaOH on straw dry weight, at 60° C. for 1 hour. The suspension is washed again, adjusted to pH 7 and filtered. Amounts of straw corresponding to 0.25 g DW were used to determine the in-vitro digestibility of the resulting straw according to R. W. Mellenberger et al. (J. Sci. 30, 105–1011, 1970). The results were compared to hay and cotton linters.

Results: Table 3: 14/15

|  | In-vitro digestibility (%) |
|---|---|
| Cotton linters | 80 |
| Hay | 57 |
| Barley straw untreated | 36 |
| Barley straw treated | 69 (91% improvement) |

INDUSTRIAL APPLICATION

From the industrial point of view, the method for the depolymerization and/or modification of lignin according to the present invention offers a wide variety of applications. The copper/coordination compound/peroxide system can be applied in any kind of process where the depolymerization or chemical modification of lignin is in demand as e.g. in chemical or mechanical pulping, dissolving pulping, pulp bleaching, deinking of waste paper, effluent treatment, pretreatment of lignocellulosics as animal feed stock, wood saccharification and wood processing. It can also be used to depolymerize or modify lignin related compounds like polyaromatic hydrocarbons (PAH) or coal. When applied in pulp bleaching according to the invention, the final lignin content of the pulp is decreased while brightness of the pulp is increased in relation to ECF or TCF bleached pulp. The new delignifying system can be applied as a bleaching stage on its own, being part of a bleaching sequence, or copper and coordination compound can be added to an aqueous peroxide solution in any kind of peroxide containing bleaching step. The selectivity of the reaction for lignin depolymerization in pulp can be increased by using organic peroxide instead of hydrogen peroxide.

What is claimed is:

1. A process for depolymerizing and/or chemically modifying lignin or lignin-like compounds in which a solution of copper and peroxide acts on lignin and/or lignin-like substance at a temperature of less than 100° C., characterized in that the solution is an aqueous solution containing copper or a copper complex, a coordination compound and peroxide wherein the concentration of the copper or copper complex is between 0.001% and 5%, the concentration of the coordination compound is lower than 20% and the concentration of peroxide is between 0.01% and 20%.

2. The process according to claim 1, characterized in that the coordination compound contains nitrogen.

3. The process according to claim 1, characterized in that the coordination compound contains a hydroxyl group.

4. The process according to claim 1, characterized in that the coordination compound contains ether.

5. The process according to claim 1, characterized to that the coordination compound contains sulfur.

6. The process according to claim 1, characterized in that the coordination compound contains an olefinic double bond.

7. The process according to claim 1 wherein the concentration of the coordination compound is between 0.001–5% and the concentration of the peroxide is between 0.1–10%.

8. The process according to claim 2, wherein the coordination compound is selected from the group consisting of pyridine, histidylglycine, phthalocyanine, and acetonitril.

9. The process according to claim 3, wherein the coordination compound is catechol.

10. The process according to claim 4, wherein the coordination compound is 18-crown-6.

11. The process according to claim 5, wherein the coordination compound is mercaptosuccinic acid.

12. The process according to claim 6, wherein the coordination compound is 1,3-cyclohexadiene.

13. The process according to claim 1 or 7, characterized in that the peroxide is selected from the group consisting of a hydrogen peroxide, organic peroxide, a peracid, and a metal salt of a peracid.

14. The process according to claim 1 or 7, characterized in that the peroxide is produced by a peroxide-generating system added to the lignin-containing solution.

15. A process for depolymerizing and/or chemically modifying lignin or lignin-like compounds comprising degrading the lignin or lignin-like compounds at a temperature of less than 100° C. in an aqueous solution containing copper or a copper complex, a coordination compound and peroxide, wherein the coordination compound is selected from the group consisting of nitrogen-containing compounds, hydroxyl-containing compounds, ether containing compounds, sulfur containing compounds, compounds containing olefinic double bonds and mixtures thereof.

16. A process for depolymerizing and/or chemically modifying lignin or lignin-like compounds comprising degrading the lignin or lignin-like compounds at a temperature of less than 100° C. in an aqueous solution containing copper or a copper complex, a coordination compound and peroxide, wherein the coordination compound is selected from the group consisting of pyridine, histidylglycine, phthalocyanine, acetonitril, catechol, 18-crown-6, mercaptosuccinic acid, 1,3-cyclohexadiene and mixtures thereof.

* * * * *

UNITED STATES PATENT AND TRADEMARK OFFICE
CERTIFICATE OF CORRECTION

PATENT NO.     : 6,214,976 B1
DATED          : April 10, 2001
INVENTOR(S)    : Watanabe et al.

It is certified that error appears in the above-identified patent and that said Letters Patent is hereby corrected as shown below:

Title page,
Item [73], Assignee, "Vienna" should read -- Vienna (AT) --
"Watababe" should read -- Watanabe --

Column 3,
Line 36, "Fe2+" should read -- $Fe_2^+$ --

Column 4,
Line 8, "hydorcarbons" should read -- hydrocarbons --

Column 6,
Line 42, "destilled" should read -- distilled --

Column 7,
Line 7, "destilled" should read -- distilled --

Column 8,
Line 29, "acetonitril" should read -- acetonitrile --
Line 51, "ether contain-" should read -- ether-contain- --
Line 52, "sulfur containing" should read -- sulfur-containing --
Line 61, "acetonitril" should read -- acetonitrile --

Signed and Sealed this

Twenty-fourth Day of December, 2002

JAMES E. ROGAN
*Director of the United States Patent and Trademark Office*